Dec. 3, 1940.   J. A. BREWSTER   2,223,597
APPARATUS FOR PROTECTING VEGETATION
Filed Dec. 30, 1937
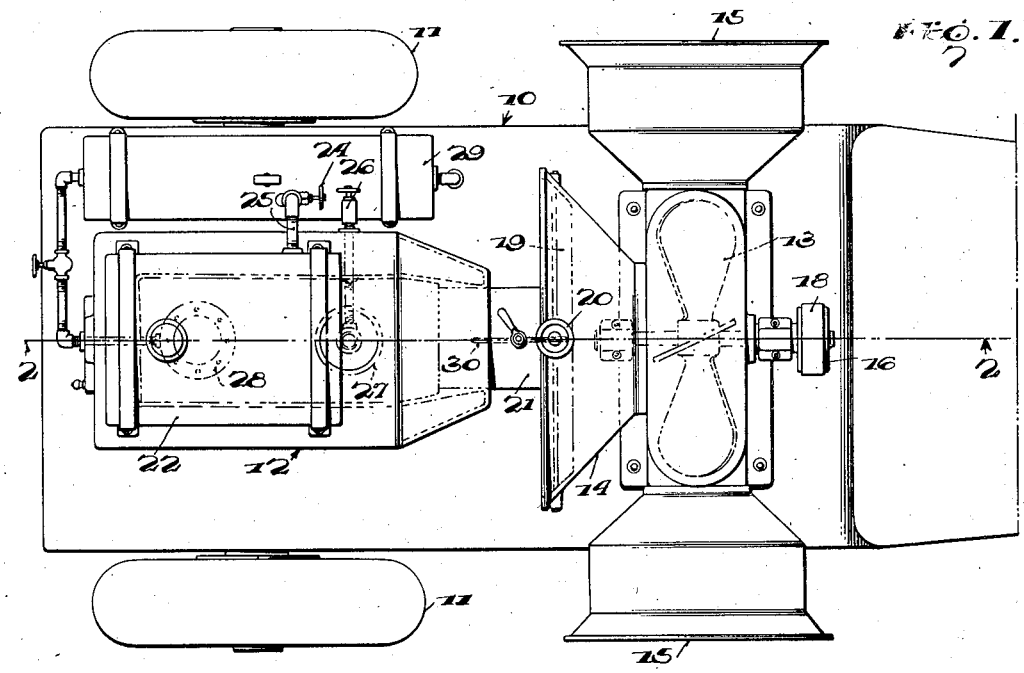
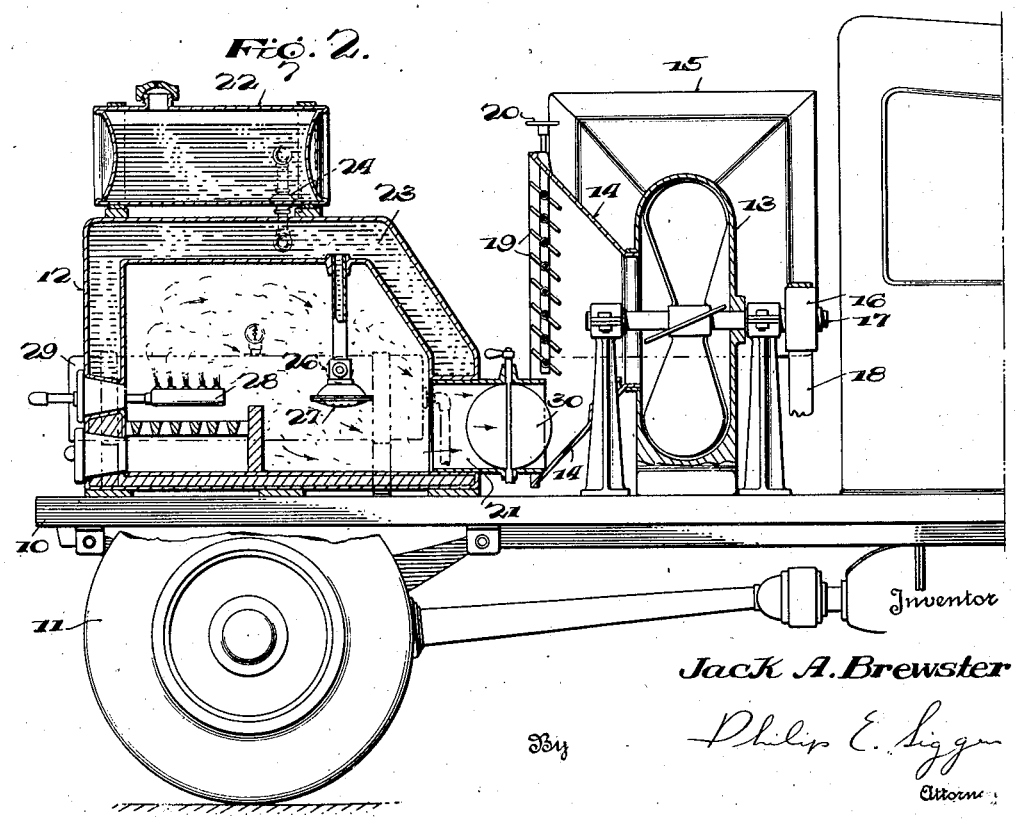
Inventor
Jack A. Brewster
By Philip E. Liggn
Attorney Patented Dec. 3, 1940

2,223,597

UNITED STATES PATENT OFFICE 2,223,597

APPARATUS FOR PROTECTING VEGETATION

Jack A. Brewster, Redlands, Calif.

Application December 30, 1937, Serial No. 182,477

4 Claims. (Cl. 47—2)

This invention relates to improvements in apparatus for protecting vegetation during frosty weather, and in general, aims to provide certain improvements in the apparatus described and claimed in my pending application Serial No. 162,370.

The particular improvements herein described are concerned with improving the mobility, controllability, efficacy and economy of the apparatus, as is explained in connection with the following description of the preferred embodiment of the invention shown in the accompanying drawing forming a part of this specification.

In the drawing—

Fig. 1 is a plan view partly diagrammatic, of an orchard-heating unit on a truck body, omitting most of the truck;

Fig. 2 is a sectional elevation, also partly diagrammatic, the same parts being omitted.

Referring particularly to the drawing, there is shown a truck body 10 and wheels 11, parts of a standard motor truck which is used to transport the orchard-heating unit (to be described) into an orchard and to move said unit up and down between the rows of trees to deliver masses of heated, humidified air to the trees themselves, whenever there is danger of frost-killing of the fruit. The wheels 11 may be similar to those tractor wheels which have very large balloon tires adapted to roll over soft, wet, cultivated soil without sinking in, as the truck will be used during the wet season of such agricultural regions as the Rio Grande section of Texas and the orange and lemon belt of California.

Removably secured upon the floor of the truck platform is a heating and humidifying unit comprising an oil furnace 12, a blower 13 and an air intake 14. The blower 13 is shown as having two outlets 15, one on each side of the truck body, each of large size so that there is no back pressure, and the air from the blower is delivered as a gentle blast upon the vegetation to be protected. The blower is preferably driven by pulley 16 on its shaft 17, and a belt 18 connects with the power take-off (not shown) of truck 10. Said take-off is driven by the truck engine (not shown) and hence provides a variable speed drive for the blower, as will be understood. A plurality of vanes 19, controlled by rod 20 extending to the outside of intake 14, provide means for controlling the volume of atmospheric air drawn into the casing of the blower 13.

To heat the air blown by the blower upon the vegetation, the oil furnace 12 delivers its products of combustion directly into the intake 14, which is of large size compared to the flue 21 of the furnace, so that a volume of air several times as great as the maximum volume of products of combustion from the furnace, may be sucked into the blower casing, there to be intimately mixed with the products of combustion by the whirling blades, and the mixture then blown out through outlets 15. This mixing of hot products of combustion with cool atmospheric air is described in my aforesaid pending application, but in the apparatus of that application, the warm mixture is immediately humidified to increase the specific heat of the mixture and make it more effective as a vegetation-protecting layer or blanket.

According to the present invention, the moisture for humidification is introduced directly into the furnace 12, preferably into the zone of highest temperature, where the moisture will be instantly vaporized and will be carried, as steam, out through the flue 21. This steam commingles with the cool atmospheric air and hot products of combustion and may completely humidify the mixture thereof, without creating any back pressure on the blower, as would be the case if humidifying curtains or screens were employed. The volume of steam to be mixed with the air and products of combustion will depend, of course, on the temperature of the products of combustion discharged from the furnace and the draft through intake 14, as well as the amount of water admitted to the interior of the furnace. It is preferred that the mixture discharged from the truck-mounted unit be completely saturated with moisture, so that the specific heat of the mixture blown upon the vegetation is at a maximum.

The water is supplied from a small tank 22 preferably carried on top of the furnace, or adjacent to it, and so arranged that the water therein flows by gravity to a water-jacket 23 which surrounds the major portion of the furnace walls. A valve 24 in the pipe 25 which leads to the water-jacket controls the flow of water out of the tank, and another valve 26 controls the flow of hot water, or hot water and steam, from the water-jacket to the interior of the furnace, where a nozzle 27 sprays the hot water or mixed steam and hot water into the hottest part of the combustion chamber, thus effecting instant vaporization. The water supply may be replenished from time to time by driving the truck to a water tank or a hose and filling tank 22, or where a water supply is not handy, by pumping water from a tender (not shown) which may be hitched to the rear of the truck. Obviously the water-jacket prevents much radiation of heat from the furnace walls, and insures such pre-heating of the humidifying water as to make certain the instant vaporization of the same. This is advantageous because the sucking of liquid water into the fan casing would be undesirable.

The furnace has one or more oil nozzles or burners 28 fed by oil from a tank 29 on the truck, the oil flowing either by gravity or being pumped, as is well known in the art of oil furnaces. Obviously the draft through the furnace is enormously augmented by the blower, and a damper 30 in the flue may be used to control said draft.

With the improved apparatus shown and described, vegetation, particularly citrus trees, may be efficiently and economically intermittently or periodically heated by large volumes of air conditioned as to temperature and moisture content, said conditioned air being delivered at relatively low velocity in such manner as to be projected to and within the space occupied by all portions of the trees, as the mobile apparatus passes the trees at such speed as is deemed desirable, dependent upon atmospheric conditions at any particular time or spot in the orchard. As the conditioned air passes to and into all portions of the trees, the specific heat of the conditioned air is imparted directly to the tree trunks, limbs and foliage and the vapor which is in the conditioned air condenses as it strikes the colder surfaces, thus delivering up the relatively great amount of heat which is contained in the water vapor. Due to the fact that the conditioned air is delivered at relatively low velocity, objectionable whipping of the trees or foliage is avoided; a far less volume of the moisture conditioned air is required as compared with dry heated air; the temperature at which the conditioned air is delivered to and into the trees is appreciably less than would be the case with heated air relatively free from moisture, thus avoiding burning or shrivelling of the foliage; the fact that the apparatus is mobile permits the operator to take the apparatus to only such portions of the grove as may require heating; and the delivery of the conditioned air to within the tree structure produces the most effective heating of the fruit, since the heated conditioned air displaces the cold air which normally tends to remain stagnant within the foliage of the trees.

Obviously the described invention may be embodied in several forms neither described nor shown. It will be clear that the invention is useful wherever vegetation of any kind is to be protected during cold weather.

Having described an embodiment of the invention, what I claim as new and desire to secure by Letters Patent is:

1. An apparatus for protecting vegetation against frost for use in conjunction with a self-propelled and moving vehicle comprising, in combination: a furnace having a combustion chamber with an oil burner therein and an outlet for the products of combustion; an oil tank and regulatable means for supplying oil to said burner; spray means for injecting water into the combustion chamber at a point intermediate said oil burner and furnace outlet and vaporizing the water to thereby admix the water vapor with and highly humidify the products of combustion prior to passage through said outlet; a water supply tank and regulatable means to control the supply of water to said water spray injecting means; a blower unit having an intake and outlet means, said intake being of relatively large area and greater than the area of said furnace outlet, the latter being arranged to deliver the humidified products from the furnace into said intake whereby cool atmospheric air in relatively large volume in addition to the humidified products from the furnace may be drawn into the blower unit and commingled therein; and adjustable dampers in said air intake for controlling said additional air supply to the blower unit whereby the condition of said products from the furnace may be modified and the ultimate volume and condition of air delivered from the blower unit controlled and varied at will as to temperature and degree of humidity during travel of the vehicle, said furnace, oil and water tanks and blower unit being adapted to be detachably mounted on said vehicle.

2. In an apparatus for protecting vegetation against frost for use in conjunction with and upon a self-propelled vehicle while in motion comprising, in combination: a furnace having a combustion chamber with oil burning means therein, an outlet for the products of combustion and a water jacket; an oil tank and regulatable means for supplying oil to said oil burning means; a water supply tank in communication with said water jacket; means for spraying water from the water jacket into the combustion chamber at a point intermediate said oil burning means and furnace outlet; regulatable means controlling the supply of water from said water jacket to said water spraying means whereby the degree of humidification of the products of combustion within the furnace chamber and prior to passage thereof through said outlet may be controlled; a blower unit having an intake and fixed, horizontally and laterally directed outlets on opposite sides thereof, said intake being of relatively large area and greater than the area of said furnace outlet, the latter arranged to deliver the humidified products from the furnace into said intake; and adjustable means controlling the quantity of atmospheric air admitted through said intake for admixture with the humidified products of combustion from the furnace, whereby to regulate the degree of humidity, temperature and volume of the air finally delivered while and as the vehicle is in motion the furnace, oil and water tanks and blower unit being adapted for detachable mounting on said vehicle.

3. An apparatus for protecting vegetation against frosts for use in conjunction with and upon a self propelled vehicle while the vehicle is in motion, said vehicle having a power takeoff, comprising, in combination: a furnace having a combustion chamber with a combustible fluid burner therein and an outlet for the products of combustion; a tank and regulatable means for supplying the combustible fluid to said burner; a blower unit located horizontally in line with the furnace, said blower unit having an air impeller, an intake and horizontally laterally directed outlets on opposite sides thereof, said intake being of relatively large area and greater than the area of said furnace outlet, the latter being arranged to deliver the products of combustion into said intake, and whereby cool atmospheric air in addition to the products of combustion is drawn into the blower unit through said intake and commingled within the blower unit, said impeller having a driving element adapted to be operatively connected to and driven from said power takeoff of the vehicle; and adjustable means disposed within said intake controlling said additional air supply to the blower unit, whereby said products of combustion from the furnace may be correspondingly modified and the ultimate volume and temperature of the mixed air and combustion products ultimately delivered from the blower unit controlled, said furnace, tank and blower unit being adapted for detachable mounting on said vehicle.

4. An apparatus for protecting vegetation against frost for use in conjunction with and upon a self propelled vehicle while the vehicle is in motion comprising, in combination: a furnace having a combustion chamber with a combustible fluid burner therein and an outlet for the products of combustion; a tank and regulatable means for supplying the combustible fluid to said burner; a blower unit horizontally alined with the furnace and having an intake and fixed laterally directed outlets on opposite sides thereof, said intake being of relatively large area and greater than the area of said furnace outlet, the latter being arranged to deliver the products of combustion into said intake, whereby air in addition to the products of combustion from the furnace are drawn into the blower unit and commingled within the blower unit; and adjustable means in said blower unit intake controlling said additional air supply whereby said products of combustion from the furnace may be correspondingly modified and the ultimate volume and temperature of the mixture delivered from the blower unit controlled during motion of the vehicle, said furnace, tank and blower unit being adapted for detachable mounting on said vehicle.

JACK A. BREWSTER.